US012717078B2

(12) United States Patent
Hasegawa et al.

(10) Patent No.: US 12,717,078 B2
(45) Date of Patent: Aug. 25, 2026

(54) MULTICORE OPTICAL FIBER

(71) Applicant: SUMITOMO ELECTRIC INDUSTRIES, LTD., Osaka (JP)

(72) Inventors: Takemi Hasegawa, Osaka (JP); Takahiro Suganuma, Osaka (JP); Hirotaka Sakuma, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/553,857

(22) PCT Filed: Mar. 15, 2023

(86) PCT No.: PCT/JP2023/010165
§ 371 (c)(1), (2) Date: Oct. 4, 2023

(87) PCT Pub. No.: WO2023/189621
PCT Pub. Date: Oct. 5, 2023

(65) Prior Publication Data

US 2025/0076569 A1 Mar. 6, 2025

(30) Foreign Application Priority Data

Mar. 30, 2022 (JP) ................................ 2022-055331

(51) Int. Cl.
*G02B 6/02* (2006.01)

(52) U.S. Cl.
CPC ..... *G02B 6/02395* (2013.01); *G02B 6/02042* (2013.01)

(58) Field of Classification Search
CPC ........... G02B 6/02042; G02B 6/02019; G02B 6/02395; G02B 6/03605
See application file for complete search history.

(56) References Cited

U.S. PATENT DOCUMENTS 11,726,257 B2 * 8/2023 Bennett .............. G02B 6/02042 385/126
2011/0222828 A1 9/2011 Sasaoka et al.
(Continued)

FOREIGN PATENT DOCUMENTS

CA 2344200 A1 3/2000
CN 104035166 A 9/2014
(Continued)

OTHER PUBLICATIONS

International Search Report issued in Patent Application No. PCT/JP2023/010165 dated May 16, 2023.
(Continued)

*Primary Examiner* — Eric Wong
(74) *Attorney, Agent, or Firm* — McDonald Hopkins LLC

(57) ABSTRACT

An MCF of one embodiment combines the adoption of a plurality of cores with different refractive indices with suppression of manufacturing costs. The MCF has a glass optical fiber having a plurality of cores and a cladding, and a resin coating. The plurality of cores includes a first core with a high refractive index and a second core with a low refractive index. On a cross-section of the MCF, an arrangement of centers of a plurality of portions has no rotational symmetry about the cross-section center, the portions having a refractive index higher than that of the cladding. Furthermore, a mode leakage adjustment structure is provided to reduce a difference between a cutoff wavelength of a residual higher-order mode in the second core and a cutoff wavelength of a residual higher-order mode in the first core.

9 Claims, 3 Drawing Sheets

(56) References Cited

U.S. PATENT DOCUMENTS

| | | | | |
|---|---|---|---|---|
| 2012/0008908 | A1* | 1/2012 | Imamura | G02B 6/02042 385/126 |
| 2012/0087626 | A1 | 4/2012 | Nagashima et al. | |
| 2013/0136404 | A1* | 5/2013 | Feuer | H04J 14/052 385/124 |
| 2013/0156393 | A1 | 6/2013 | Kokubun et al. | |
| 2014/0003779 | A1 | 1/2014 | Arakawa et al. | |
| 2014/0199039 | A1 | 7/2014 | Kokubun et al. | |
| 2016/0252683 | A1* | 9/2016 | Sasaki | G02B 6/3843 385/78 |
| 2016/0347645 | A1* | 12/2016 | Gonda | C03B 37/025 |
| 2018/0120502 | A1 | 5/2018 | Sasaki et al. | |
| 2021/0003773 | A1 | 1/2021 | Hayashi | |
| 2021/0294025 | A1 | 9/2021 | Hayashi et al. | |
| 2022/0043201 | A1* | 2/2022 | Bickham | G02B 6/02042 |
| 2022/0120963 | A1* | 4/2022 | Hayashi | G02B 6/02009 |
| 2022/0214496 | A1 | 7/2022 | Sakamoto et al. | |
| 2023/0266520 | A1 | 8/2023 | Oda et al. | |
| 2025/0216595 | A1* | 7/2025 | Hasegawa | G02B 6/02042 |

FOREIGN PATENT DOCUMENTS

| | | | |
|---|---|---|---|
| CN | 112198586 | A | 1/2021 |
| EP | 2545400 | B1 | 12/2017 |
| JP | 2011-170099 | A | 9/2011 |
| JP | 2011-209702 | A | 10/2011 |
| JP | 2012-168453 | A | 9/2012 |
| JP | 2013-033865 | A | 2/2013 |
| JP | 2014-197094 | A | 10/2014 |
| JP | 2021-012226 | A | 2/2021 |
| WO | 00/16131 | A2 | 3/2000 |
| WO | 2011/004539 | A1 | 1/2011 |
| WO | 2012/026473 | A1 | 3/2012 |
| WO | 2012/121027 | A1 | 9/2012 |
| WO | 2013/027776 | A1 | 2/2013 |
| WO | 2016/190228 | A1 | 12/2016 |
| WO | 2020/217939 | A1 | 10/2020 |
| WO | 2021/131976 | A1 | 7/2021 |
| WO | 2022/085534 | A1 | 4/2022 |
| WO | 2022/210786 | A1 | 10/2022 |

OTHER PUBLICATIONS

U.S. Appl. No. 18/848,561 Specification.

U.S. Office Action issued in U.S. Appl. No. 18/848,561 dated May 14, 2026.

* cited by examiner

CROSS-SECTIONAL STRUCTURE
EMBODIMENT 1
EMBODIMENT 2
PATTERN 1 (2-CORE)
PATTERN 2 (4-CORE)
PATTERN 3 (2-CORE, 4-CORE)
100A(100)
130
110A(110)
140
120
111
AX
112
100B
140
120
122
121
110B
Δx
111
111a
AX
112
112a
100C
140
110C
111
112
130
113
AX
120
114
100D
140
120
122
121
Δx
110D
111
111a
112a
112
113
113a
AX
114
114a
100E
110E
120
122
121
140
130
111
AX
112
100F
140
120
122
121
Δx
110F
111
111a
130
112a
112
113
113a
AX
114
114a

MULTICORE OPTICAL FIBER

TECHNICAL FIELD

The present disclosure relates to a multicore optical fiber (hereinafter referred to as "MCF").

This application claims the benefit of Japanese Patent Application No. 2022-055331, filed Mar. 30, 2022, the content of which is relied upon and incorporated herein by reference in its entirety.

BACKGROUND ART

Patent Document 1 and Patent Document 2 disclose MCFs each having a plurality of cores with different refractive indices. By arranging such a plurality of cores with different refractive indices in a cladding, mode coupling between the cores is suppressed and as a result, noise contamination in signal light propagating in each core is suppressed.

CITATION LIST

Patent Literatures

[Patent Document 1]: Japanese Patent Application Laid-Open No. 2021-012226

[Patent Document 2]: PCT International Publication No. WO 2013/027776

SUMMARY OF INVENTION

An MCF of the present disclosure comprises a glass optical fiber and a resin coating. The glass optical fiber has a plurality of cores each extending along a fiber axis serving as a central axis, a cladding surrounding the plurality of cores, and a mode leakage adjustment structure. The plurality of cores include a first core having a high refractive index (hereinafter referred to as "high refractive index core") and a second core having a refractive index lower than that of the high refractive index core (hereinafter referred to as "low refractive index core"). The refractive index of the cladding is lower than the refractive index of any core among all the cores. The resin coating is provided on an outer peripheral surface of the glass optical fiber. On a cross-section of the MCF orthogonal to the central axis, an arrangement of centers of a plurality of portions has no rotational symmetry about a center of the cross-section, while each of the plurality of portions has a refractive index different from that of the cladding. The plurality of portions include the plurality of cores. Furthermore, the mode leakage adjustment structure functions to reduce a difference between a cutoff wavelength of a residual higher-order mode in the low refractive index core and a wavelength of a residual higher-order mode in the high refractive index core.

DESCRIPTION OF EMBODIMENTS

Figure 1:
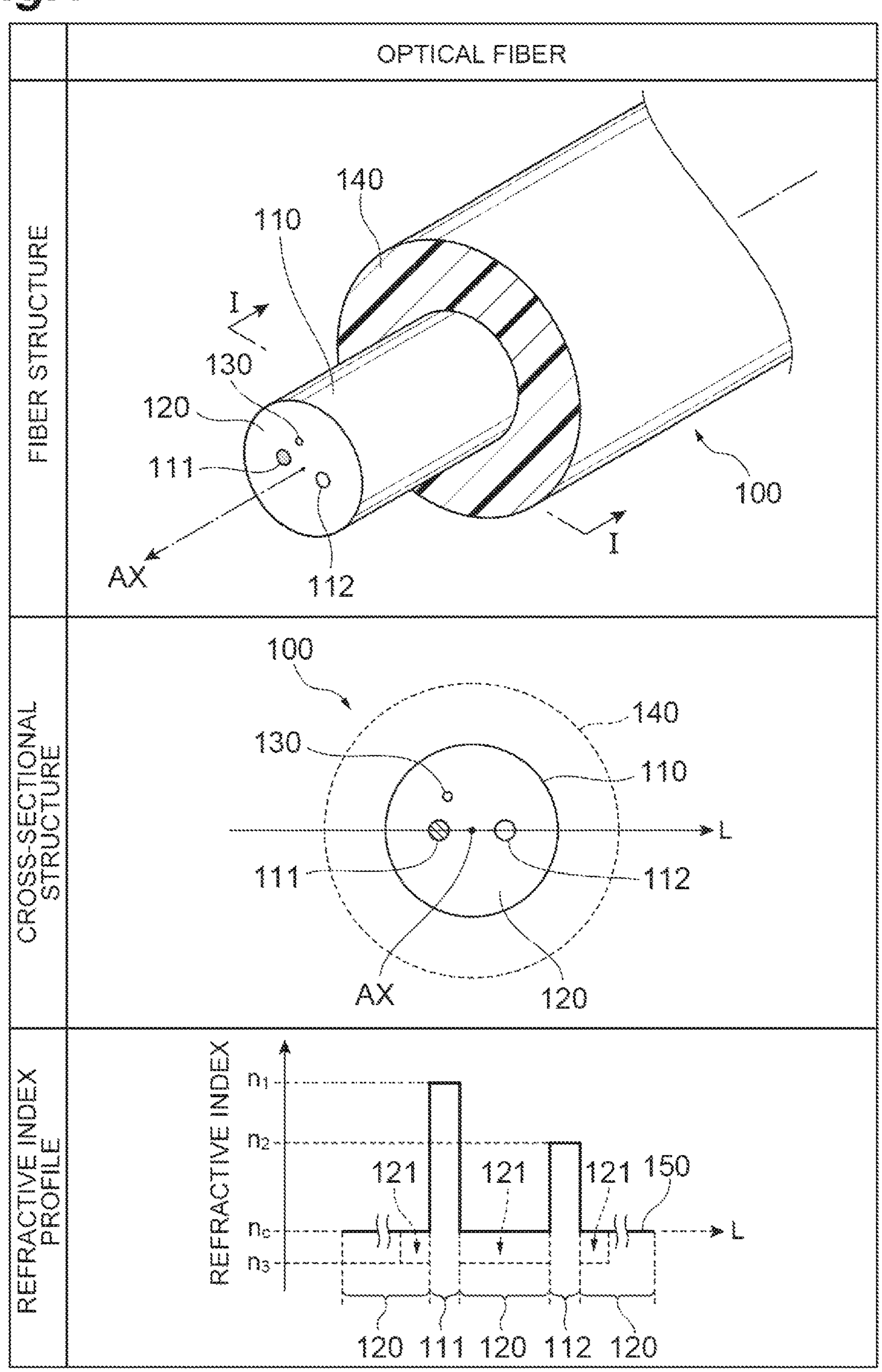
FIG. 1 shows an example of the structure of the MCF according to the present disclosure.

Problem to Be Solved by Present Disclosure

The inventors have examined the conventional technologies described above and found the following issues. That is, in conventional MCFs, the adoption of multiple cores with different refractive indices has resulted in large variations in transmission quality between cores. In particular, high refractive index cores are more likely to have residual higher-order modes due to the longer cutoff wavelength. On the other hand, low refractive index cores are more likely to have higher bending loss of the fundamental mode, although the higher-order modes are less likely to remain compared to high refractive index cores. Since strict manufacturing tolerances are required to suppress such quality degradation of both the high refractive index cores and the low refractive index cores, this problem makes the manufacturing cost of MCFs high.

The present disclosure has been made to solve the above-mentioned problem and is intended to provide an MCF with a structure that both utilizes multiple cores with different refractive indices and suppresses manufacturing costs.

Effects of Present Disclosure

According to the MCF of the present disclosure, it is possible to effectively suppress manufacturing costs by expanding manufacturing tolerance in a configuration in which multiple cores with different refractive indices are employed.

DESCRIPTION OF EMBODIMENT OF PRESENT DISCLOSURE

First of all, aspects of an embodiment of the present disclosure will be described by individually listing the aspects.

Regarding the MCF of the present disclosure, (1) it includes a glass optical fiber, and a resin coating. The glass optical fiber has a plurality of cores each extending along a fiber axis serving as a central axis, a cladding surrounding the plurality of cores, and a mode leakage adjustment structure. The plurality of cores include a high refractive index core as a first core and a low refractive index core as a second core having a refractive index lower than that of the high refractive index core. The refractive index of the cladding is lower than the refractive index of any core among all the cores. The resin coating is provided on an outer peripheral surface of the glass optical fiber. On a cross-section of the MCF orthogonal to the central axis, an arrangement of centers of a plurality of portions has no rotational symmetry about a center of the cross-section, while each of the plurality of portions has a refractive index different from that of the cladding. The plurality of portions includes the plurality of cores. Furthermore, the mode leakage adjustment structure functions to reduce a difference between a cutoff wavelength of a residual higher-order mode in the low refractive index core and a cutoff wavelength of a residual higher-order mode in the high refractive index core.

According to the structure described above, it is possible to increase the leakage of the residual higher-order mode in the high-refractive-index core and/or to reduce the bending loss of the fundamental mode in the low-refractive-index core. This matter effectively suppresses the lengthening of the cutoff wavelength in the high refractive index core and/or the increase in bending loss of the fundamental mode in the low refractive index core, thereby making it easier to balance transmission quality between the high refractive index core and the low refractive index core. As a result, the design freedom of cores employed in the MCF is increased, and manufacturing costs can be effectively suppressed.

(2) In the above-mentioned (1), the mode leakage adjustment structure may employ a first structure defined by the placement of a high refractive index marker in the cladding. Specifically, the high refractive index marker extends along the plurality of cores and has a refractive index higher than that of the cladding. The center of the high refractive index marker is located at a position where the distance to the center of the high refractive index core is shorter than the distance to the center of the low refractive index core of the plurality of cores. In this case, while maintaining the marker's original function of making its presence visible through the refractive index difference with the surrounding cladding, it is possible to promote mode coupling between the higher-order mode propagating through the high-refractive index core and the mode propagating through the high-refractive index marker, thereby increasing the leakage of the higher-order mode in the high-refractive index core.

(3) In the above-mentioned (2), in the first structure of the mode leakage adjustment structure, the V value with respect to the high refractive index marker at wavelength k may be 2.405 or less. In this case, confinement of the higher-order mode leaking from the high refractive index core becomes possible, while maintaining the original function of the high refractive index marker. The V value with respect to the high refractive index marker is the following Formula (1):

$$V=(2\pi/\lambda)-r-(n_{marker}{}^{2}-n_{clad}{}^{2})^{1/2}, \quad (1)$$

where $(2\pi/\lambda)$ is the wavenumber of light of wavelength $\lambda$ in vacuum, r is the radius of the high refractive index marker, $n_{marker}$ is the refractive index of the high refractive index marker, and $n_{clad}$ is the refractive index of the cladding.

(4) In the above-mentioned (2) or (3), in the first structure of the mode leakage adjustment structure, the cladding may include an inner cladding surrounding the plurality of cores and the high refractive index marker, and an outer cladding provided on the outer surface of the inner cladding and having a refractive index higher than that of the inner cladding. In the case that such a double cladding structure is employed for the cladding, the refractive index of the cladding is defined by the refractive index of the outer cladding, and the diameter of the cladding matches the outer diameter of the outer cladding. The double cladding structure increases the leakage of the higher-order modes propagating through the plurality of cores and the leakage of the mode propagating through the high refractive index marker, while the bending loss of the fundamental modes propagating through the plurality of cores remains low. By this, manufacturing tolerance can be expanded. Instead of the high refractive index marker in this aspect, a low refractive index marker having a refractive index lower than that of the cladding may be used, and the center of the low refractive index marker may be placed at a position where the distance to the center of the low refractive index core is shorter than the distance to the center of the high refractive index core of the plurality of cores. In this case, the manufacturing tolerance can also be expanded.

(5) In the above-mentioned (3), the wavelength $\lambda$ may be the shortest wavelength of the signal light transmitted to the plurality of cores in the MCF of the present disclosure, typically 1530 nm.

(6) In the above-mentioned (1), the mode leakage adjustment structure may employ a second structure defined by a double cladding structure employed for the cladding and a core arrangement in which the plurality of cores are shifted along a direction orthogonal to the central axis. In the second structure of the mode leakage adjustment structure, the double cladding structure comprises an inner cladding that surrounds the plurality of cores and has an outer diameter D, and an outer cladding that is provided on the outer surface of the inner cladding and has a refractive index higher than that of the inner cladding. In such a double cladding structure, the refractive index of the outer cladding is defined as the refractive index of the cladding. In the core arrangement that defines the second structure, the center of the high refractive index core and/or the low refractive index core is shifted by $\Delta x$ along a line perpendicular to the central axis so that the high refractive index core is closer to the inner surface of the outer cladding than to the low refractive index core, with respect to the reference positions of the high refractive index core and the low refractive index core whose centers are equidistant from the inner surface of the outer cladding on the cross-section of the MCF. This configuration increases the leakage of the higher-order mode propagating through the high refractive index core and simultaneously reduces the bending loss of the fundamental mode propagating through the low refractive index core, thereby expanding the manufacturing tolerance.

(7) In the above-mentioned (6), in the second structure of the mode leakage adjustment structure, the ratio $\Delta x/D$ of the shift amount $\Delta x$ of the high refractive index core and/or the low refractive index core to the outer diameter D of the inner cladding may be larger than 0.01 (1% in percentage representation). Effective suppression of the increase in cutoff wavelength in the high refractive index core and/or effective suppression of the increase in bending loss in the low refractive index core will be possible.

(8) In the above-mentioned (6) or (7), in the second structure of the mode leakage adjustment structure, a high refractive index marker may be provided in the inner cladding extending along the plurality of cores and having a refractive index higher than that of the inner cladding, and the center of the high refractive index marker is arranged so that the distance to the center is shorter than the distance to the center of the low refractive index core. In this case, even when the high refractive index core is placed within the inner cladding, it is possible to easily identify the orientation of the core arrangement. Alternatively, instead of a high refractive index marker, a low refractive index marker having a refractive index lower than that of the inner cladding may be provided, and the center of the low refractive index marker may be arranged so that the distance to the center of the low refractive index core is shorter than the distance to the center of the high refractive index core. In this case, it will also be possible to easily identify the orientation of the core arrangement.

The aspects listed above in the section of [Description of Embodiment of Present Disclosure] can be applied to each of all the remaining aspects, or a combination of all of these remaining aspects.

Details of Embodiment of Present Disclosure

Hereinafter, specific structures of the MCF of the present disclosure will be described in detail with reference the accompanying drawings. The present invention is not limited to these examples, but is defined by the scope of the claims, and is intended to include meanings equivalent to the scope of the claims and all modifications within the scope. In addition, the same elements will be denoted by the same reference signs in the description of the drawings, without redundant description.

FIG. 1 shows an example of the structure of the MCF (multicore optical fiber) according to the present disclosure (indicated as "optical fiber" in FIG. 1). The upper part of FIG. 1 (indicated as "fiber structure" in FIG. 1) shows an example of a typical structure of the MCF 100 of the present disclosure. The middle part of FIG. 1 (indicated as "cross-sectional structure" in FIG. 1) shows a cross-sectional structure of the MCF 100 along the I-I line shown in the upper part of FIG. 1. The lower part of FIG. 1 (indicated as "refractive index profile" in FIG. 1) shows a refractive index profile 150 showing the refractive index of each portion along the line L shown in the middle part of FIG. 1.

The MCF 100 shown in the upper part of FIG. 1 and the middle part of FIG. 1 has a glass optical fiber 110 and a resin coating 140 provided on the outer peripheral surface of the glass optical fiber 110. The upper part of FIG. 1 and the middle part of FIG. 1 show, as an example, Embodiment 1 to which a first structure of a mode leakage adjustment structure is applied. The glass optical fiber 110 includes two cores, a cladding 120, and the mode leakage adjustment structure. One of the two cores is a high refractive index core 111 and the other is a low refractive index core 112 having a refractive index lower than that of the high refractive index core 111. The relative refractive index difference of the low refractive index core 112 to the high refractive index core 111 may be −0.01% or less, or −0.02% or less. This causes a difference in the effective refractive indices of the waveguiding modes of the cores in such a state that the optical fiber is extended, thereby suppressing crosstalk. The relative refractive index difference of the low refractive index core 112 to the high refractive index core 111 may be −0.05% or more. This suppresses the increase in transmission loss due to mode coupling between the fundamental mode of one core and the higher-order mode of the other core. These high refractive index core 111 and low refractive index core 112 are arranged across the fiber axis AX, which is the central axis of the MCF 100, and each extends along the fiber axis AX. Three or more cores may be applied to the MCF 100. The mode leakage adjustment structure functions to increase the leakage of the residual higher-order mode light in the high refractive index core 111. In the example shown in the upper part of FIG. 1 and the middle part of FIG. 1, a high refractive index marker 130 is provided in the cladding 120 as the first structure of the mode leakage adjustment structure.

The high refractive index marker 130 extends along the two cores and has a refractive index higher than the refractive index of the cladding 120. The center of the high refractive index marker 130 is located where the distance to the center of the high refractive index core 111 is shorter than the distance to the center of the low refractive index core 112. In this case, while maintaining the original function of the high refractive index marker 130, namely, to identify the orientation of the core arrangement by enabling visibility through the refractive index difference with the surrounding cladding, leakage of higher-order modes propagating through the high refractive index core can be increased by increasing the mode coupling between the higher-order mode propagating through the high refractive index core 111 and the mode propagating through the high refractive index marker 130. For this purpose, the ratio of the distance to the center of the high refractive index core 111 with respect to the distance to the center of the low refractive index core 112 may be 3% or more, and furthermore may be 6% or more. The V value (see Formula (1)) with respect to the high refractive index marker 130 at wavelength $\lambda$ may be 2.405 or less. In this case, it is still possible to increase the leakage of the higher-order mode propagating through the high refractive index core while maintaining the original function of the marker. As described above, the wavelength $\lambda$ is the shortest wavelength of the signal light transmitted to the multiple cores in the MCF of this disclosure, typically 1530 nm.

As shown in the middle part of FIG. 1, in one example of MCF 100, the element arrangement on the end face of the glass optical fiber 110, namely the arrangement of the high refractive index core 111, the low refractive index core 112, and the high refractive index marker 130, which have refractive indices different from that of the cladding 120, has no rotational symmetry with respect to the center of the end face where the fiber axis AX intersects. This means that the element arrangement on the end face of the glass optical fiber 110 constitutes a plane figure with rotational symmetry of order 1. In other words, the element arrangement consisting only of the high refractive index core 111 and the low refractive index core 112 is a plane figure with rotational symmetry of order 2, but the element arrangement further including the high refractive index marker 130 no longer has no rotational symmetry.

The MCF 100 has the refractive index profile 150 as shown in the lower part of FIG. 1. The solid line shows the refractive index profile 150 of Embodiment 1 of MCF 100, and the dashed line shows the refractive index profile of Embodiment 2 of MCF 100, which is an example having the mode adjustment structure with a second structure. In the refractive index profile 150 of Embodiment 1 of MCF 100, the high refractive index core 111 (core number 1, as hereafter) has a refractive index $n_1$, the low refractive index core 112 (core number 2, as hereafter) has a refractive index $n_2$ lower than the refractive index $n_1$, and the cladding 120 has a refractive index $n_C$ lower than those of both the refractive indices $n_1$ and $n_2$. The high refractive index marker 130 has a refractive index lower than the refractive index $n_2$ of the low refractive index core 112 and higher than the refractive index $n_C$ of the cladding 120.

Figure 2:
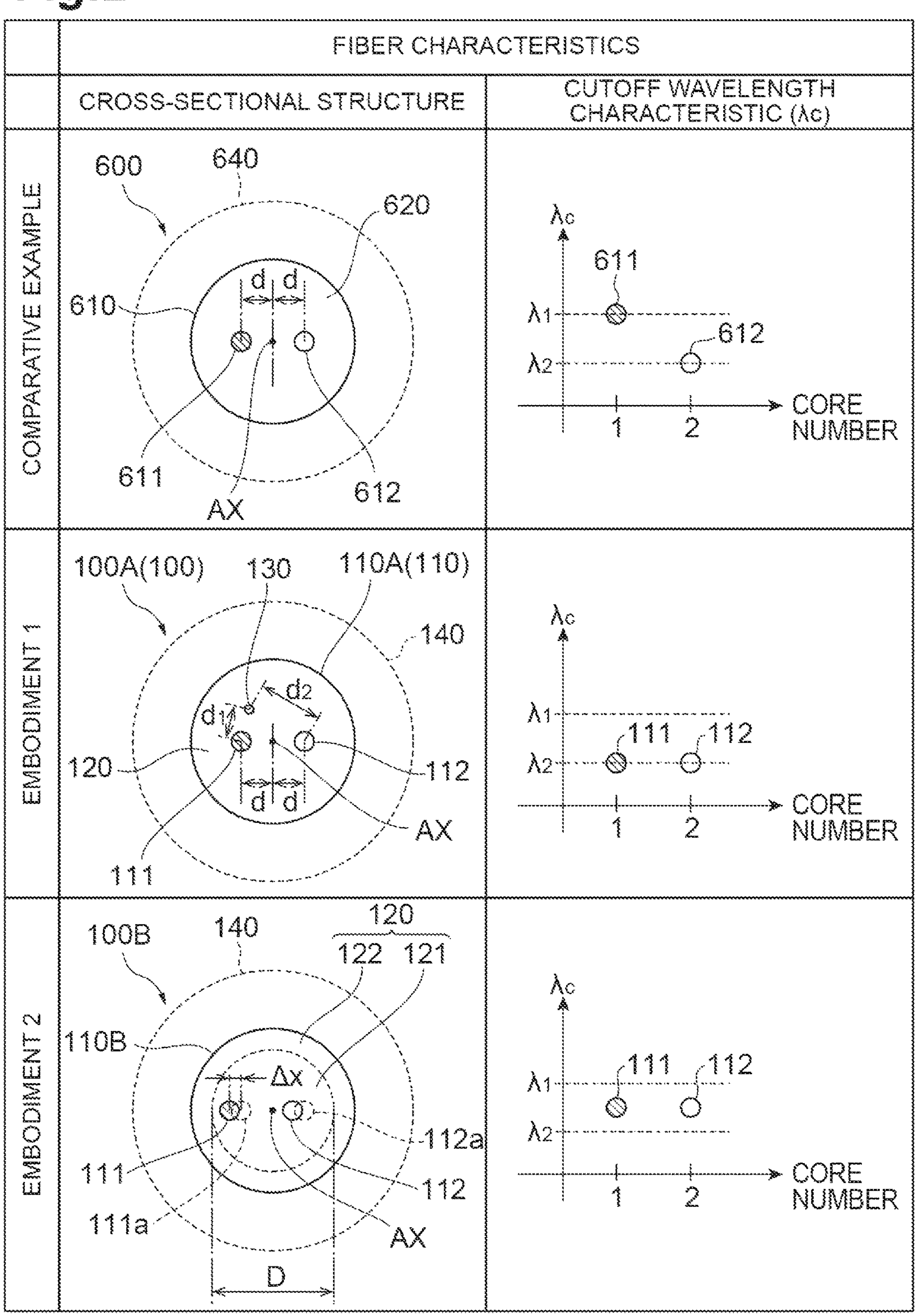
FIG. 2 illustrates fiber characteristics of the MCF according to the present disclosure together with a comparative example.

FIG. 2 illustrates fiber characteristics of the MCF according to the present disclosure together with a comparative example (indicated as "fiber characteristics" in FIG. 2). The upper part of FIG. 2 (indicated as "comparative example" in FIG. 2) shows the cross-sectional structure of the MCF 600 according to the comparative example and the fiber characteristics with respect to the cutoff wavelength kc of the residual higher-order mode in the respective core (hereinafter referred to as "cutoff wavelength characteristic"). The middle part of FIG. 2 (indicated as "embodiment 1" in FIG.

2) shows the cross-sectional structure and the cutoff wavelength characteristic of the MCF 100A (100) according to Embodiment 1. The lower part of FIG. 2 (indicated as "embodiment 2" in FIG. 2) shows the cross-sectional structure and the cutoff wavelength characteristic of the MCF 100B according to Embodiment 2. Each of the fiber cross-sections shown in FIG. 2 corresponds to the fiber cross-section along the I-I line shown in the upper part of FIG. 1. In the "fiber characteristics" column, the left side is indicated as "cross-sectional structure" and the right side is indicated as "cutoff wavelength characteristic (kc)".

The MCF 600 according to the comparative example shown in the upper part of FIG. 2 is a two-core MCF. The MCF 600 has a glass optical fiber 610 and a resin coating 640. The glass optical fiber 610 includes a core 611 with a high refractive index and a core 612 with a low refractive index, and a cladding 620. Since the center positions of the high refractive index core 611 and the low refractive index core 612 are both separated from the fiber axis AX by a distance d, the core arrangement defined by the centers of the high refractive index core 611 and the low refractive index core 612 on the end face of the MCF 600 constitutes a plane figure with the rotation symmetry of order 2. The high refractive index core 611 and the low refractive index core 612 are optically distinguishable components. That is, the high refractive index core 611 and the low refractive index core 612 are distinguishable by the difference in brightness observed when light is irradiated from the side. In the MCF 600, the cladding 620 has a single layer structure. The MCF 600 with such a structure has the cutoff wavelength characteristic as shown in the upper part of FIG. 2. That is, since the higher-order mode remains in the high refractive index core 611, the cutoff wavelength λ1 of the high refractive index core 611, indicated by core number 1, is longer than the cutoff wavelength λ2 of the low refractive index core 612, indicated by core number 2.

On the other hand, as shown in the middle part of FIG. 2, the MCF 100A according to Embodiment 1 is a two-core MCF and has the first structure described above as a mode leakage adjustment structure. Namely, the structure of the MCF 100A is the same as that of the MCF 100 shown in the upper part of FIG. 1 and the middle part of FIG. 1, and has a glass optical fiber 110A corresponding to the glass optical fiber 110, and a resin coating 140. The glass optical fiber 110A includes a high refractive index core 111 and a low refractive index core 112, a cladding 120, and a first structure of the mode leakage adjustment structure. In the MCF 100A, both of the distance from the fiber axis AX to the center of the high refractive index core 111 and the distance from the fiber axis AX to the center of the low refractive index core 112 are d. The first structure of the mode leakage adjustment is realized by the high refractive index marker 130 provided at a predetermined position in the cladding 120. The center of the high refractive index marker 130 is located where the distance d1 to the center of the high refractive index core 111 is shorter than the distance d2 to the center of the low refractive index core 112. The V value (see Formula (1)) with respect to the high refractive index marker 130 at wavelength λ is 2.405 or less.

As shown in the lower part of FIG. 2, the MCF 100B according to Embodiment 2 is a two-core MCF and has a second structure as a mode leakage adjustment structure. Namely, the MCF 100B has a glass optical fiber 110B, and a resin coating 140. The glass optical fiber 110B includes a high refractive index core 111 and a low refractive index core 112, a cladding 120, and a second structure of the mode leakage adjustment structure. In the MCF 100B, the second structure of the mode leakage adjustment structure is realized by a double-cladding structure of the cladding 120 and a shifted structure of the core arrangement comprising the high refractive index core 111 and the low refractive index core 112.

Specifically, the double-cladding structure of cladding 120 is constituted by an inner cladding 121 and an outer cladding 122 having an outer diameter D. The inner cladding 121 has a refractive index n3, and surrounds the high refractive index core 111 and the low refractive index core 112, as shown by the dashed lines in the lower part of FIG. 1. The outer cladding 122 is provided on the outer peripheral surface of the inner cladding 121 and has a refractive index $n_C$ higher than the refractive index $n_3$ of the inner cladding 121. The center positions of the high refractive index core 111 and the low refractive index core 112 are shifted by Δx from the reference positions along a line passing through the fiber axis AX so that the high refractive index core 111 is closer to the inner surface of the outer cladding 122 than to the low refractive index core 112. Here, the reference positions of the high refractive index core 111 and the low refractive index core 112 are indicated by dashed circles in the lower part of FIG. 2. In other words, the reference position 111*a* of the high refractive index core 111 and the reference position 112*a* of the low refractive index core 112 are both separated from the fiber axis AX by a distance d. The high refractive index core 111 and the low refractive index core 112 are shifted by Δx from the reference positions 111*a* and 112*a* while maintaining the center-to-center distance (=2d) from each other. The ratio Δx/D of the shift amount Δx of the high refractive index core 111 and the low refractive index core 112 to the outer diameter D of the inner cladding 121 may be greater than 0.01 (1% in percentage representation) or greater than 0.02 (2% in percentage representation). This allows the higher-order mode in the high refractive index core to be attenuated more effectively than the higher-order mode in the low refractive index core, and also allows the high refractive index core and the low refractive index core to be distinguished by the difference in distance from the core center.

In the wavelength characteristic of the MCF 100A according to Embodiment 1 in which the first structure of the mode leakage adjustment structure as described above is employed, the high refractive index marker 130 is positioned closer to the high refractive index core 111 than to the low refractive index core 112, thereby relatively increasing the average refractive index of the cladding 120 to the high refractive index core 111 and suppressing the lengthening of the cutoff wavelength. In the example of the wavelength characteristic shown in the middle part of FIG. 2, the cutoff wavelength of the high refractive index core 111 indicated by core number 1 and that of the low refractive index core 112 indicated by core number 2 are both λ2 (<λ1). On the other hand, in the MCF 100B according to Embodiment 2 in which the second structure of the mode leakage adjustment structure is employed, the high refractive index core 111 is positioned closer to the outer cladding 122 than to the low refractive index core 112. This suppresses the lengthening of the cutoff wavelength of the high refractive index core 111 indicated by core number 1, and lengthens the cutoff wavelength of the low refractive index core 112 indicated by core number 2, so that the cutoff wavelength of the high refractive index core 111 and the cutoff wavelength of the low refractive index core 112 both become a value between λ2 and λ1 as shown in the lower part of FIG. 2.

Figure 3:
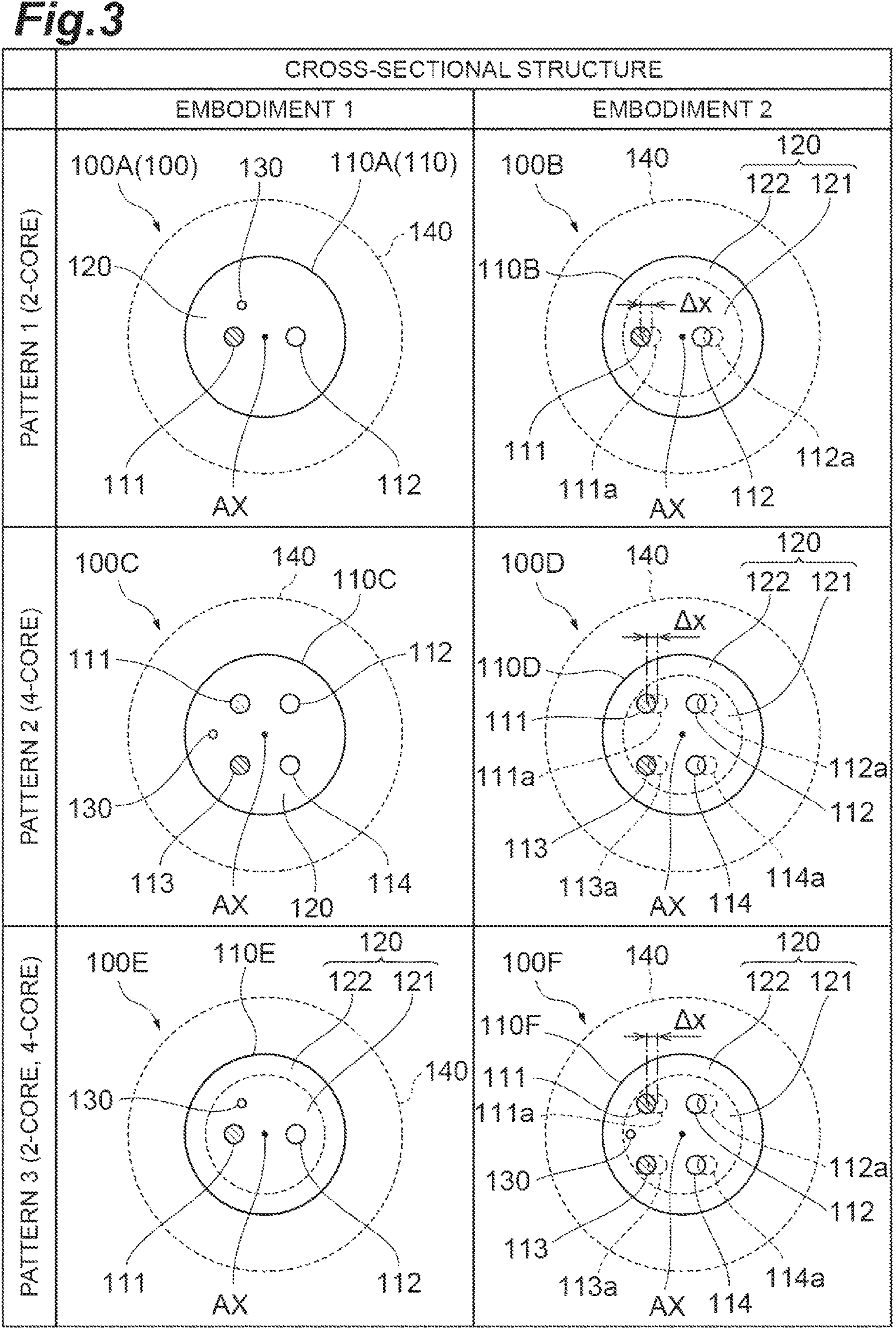
FIG. 3 illustrates various examples of the cross-sectional structure of the MCF according to the present disclosure.

FIG. 3 illustrates various examples of the cross-sectional structure of the MCF according to the present disclosure (indicated as "cross-sectional structure" in FIG. 3). The upper part of FIG. 3 (indicated as "pattern 1 (2-core)" in FIG. 3) shows the cross-sectional structures of the MCF 100A (100) according to Embodiment 1, and the MCF 100B according to Embodiment 2, respectively, as a two-core MCF. The middle part of FIG. 3 (indicated as "pattern 2 (4-core)" in FIG. 3) shows the cross-sectional structures of the MCF100C and the MCF100D, respectively, according to Embodiment 1 and Embodiment 2, as a four-core MCF. In the lower part of FIG. 3 (indicated as "pattern 3 (2-core, 4-core)" in FIG. 3), the cross-sectional structures of the MCF100E and the MCF100F according to Embodiment 1 and Embodiment 2, respectively, are shown as a two-core MCF. Each of the fiber cross-sections shown in FIG. 3 also corresponds to the fiber cross-section along the I-I line shown in the upper part of FIG. 1. In the "cross-sectional structure" column, the left side is indicated as "embodiment 1" and the right side is indicated as "embodiment 2".

Each of the MCF 100A according to Embodiment 1 and the MCF 100B according to Embodiment 2, shown in the upper part of FIG. 3, is a two-core MCF and has the same cross-sectional structure as the examples shown in the middle part of FIG. 2 and the lower part of FIG. 2.

The MCF 100C according to Embodiment 1, shown in the middle part of FIG. 3, is a four-core MCF and has a first structure as a mode leakage adjustment structure. Namely, the MCF 100C has a glass optical fiber 110C, and a resin coating 140. The glass optical fiber 110C includes high refractive index cores 111, 113, low refractive index cores 112, 114, a cladding 120, and the first structure of the mode leakage adjustment structure. In the MCF 100C, the distance from the fiber axis AX to the center of the four cores is the same. The first structure of the mode leakage adjustment structure is realized by the high refractive index marker 130 provided at a predetermined position in the cladding 120. The center of the high refractive index marker 130 is located closer to the high refractive index cores 111, 113 than to the low refractive index cores 112, 114. The distance from the center of the high refractive index marker 130 to the center of the high refractive index core 111 is the same as the distance from the center of the high refractive index marker 130 to the center of the high refractive index core 113.

The MCF 100D according to Embodiment 2, shown in the middle part of FIG. 3, is a four-core MCF and has a second structure as a mode leakage adjustment structure. Namely, the MCF 100D has a glass optical fiber 110D, and a resin coating 140. The glass optical fiber 110D includes high refractive index cores 111, 113, low refractive index cores 112, 114, a cladding 120, and a second structure as a mode leakage adjustment structure. The second structure of the mode leakage adjustment structure is defined by the double-cladding structure of the cladding 120 and the shifted structure of the four cores. The double-cladding structure of the cladding 120 is constituted by an inner cladding 121 with a refractive index $n_3$ and an outer diameter D, and an outer cladding 122 with a refractive index $n_C$ ($>n_3$). In the shifted structure of the four cores, the high refractive index cores 111, 113 and the low refractive index cores 112, 114 are shifted by $\Delta x$ from the reference positions 111$a$, 112$a$, 113$a$, 114$a$, respectively ($\Delta x/D>1\%$) so that the high refractive index cores 111, 113 are closer to the inner wall surface of the outer cladding 122 than to the low refractive index cores 112, 114.

The MCF 100E according to Embodiment 1, shown in the lower part of FIG. 3, is a two-core MCF and, like the MCF 100A, has a first structure as a mode leakage adjustment structure. However, the glass optical fiber 110E of the MCF 100E differs from the glass optical fiber 110A of the MCF 100A in that the cladding 120 has a double-cladding structure. In such a structure, it is possible to leak more the residual higher-order mode in the high refractive index core 111, as compared with the case of the MCF 100A.

The MCF 100F according to Embodiment 2, shown in the lower part of FIG. 3, is a four-core MCF and, like the MCF 100D, has a second structure as a mode leakage adjustment structure. However, the glass optical fiber 110F of the MCF 100F differs from the glass optical fiber 110D of the MCF 100D in that the high refractive index marker 130 is located in the inner cladding 121 in addition to the high refractive index cores 111, 113 and low refractive index cores 112, 114. Even in this configuration, it is possible to leak more the residual higher-order mode in the high refractive index core 111, as compared with the case of the MCF 100D.

REFERENCE SIGNS LIST

100, 100A, 100B, 100C, 100D, 100E, 100F . . . MCF
110, 110A, 110B, 110C, 110D, 110E, 110F . . . Glass optical fiber
111, 113 . . . High refractive index core
112, 114 . . . Low refractive index core
111$a$, 112$a$, 113$a$, 114$a$ . . . Reference position
120 . . . Cladding
121 . . . Inner cladding
122 . . . Outer cladding
130 . . . High refractive index marker
140 . . . Resin coating
150 . . . Refractive index profile
AX . . . Fiber axis
L . . . Line
$\lambda$1, $\lambda$2 . . . Cutoff wavelength
$\Delta x$ . . . Shift amount

What is claimed is:

1. A multicore optical fiber comprising:

a glass optical fiber having a plurality of cores each extending along a central axis, and a cladding surrounding the plurality of cores, the plurality of cores including a first core with a high refractive index and a second core with a refractive index lower than that of the first core; and a resin coating provided on an outer peripheral surface of the glass optical fiber, wherein on a cross-section of the multicore optical fiber orthogonal to the central axis, an arrangement of centers of a plurality of portions that has a refractive index different from a refractive index of the cladding has no rotational symmetry about a center of the cross-section, the multicore optical fiber further comprises a mode leakage adjustment structure for reducing a difference between a cutoff wavelength of a residual higher-order mode in the second core and a cutoff wavelength of a residual higher-order mode in the first core, the mode leakage adjustment structure includes a high refractive index marker extending along the plurality of cores and having a refractive index higher than that of the cladding, and a center of the high refractive index marker is located in the cladding where a distance to a center of the first core is shorter than a distance to a center of the second core.

2. The multicore optical fiber according to claim 1, wherein a V value with respect to the high refractive index marker at a wavelength $\lambda$ is 2.405 or less.

3. The multicore optical fiber according to claim 1, wherein the cladding includes an inner cladding surrounding the plurality of cores and the high refractive index marker, and an outer cladding provided on an outer peripheral surface of the inner cladding and having a refractive index higher than that of the inner cladding.

4. The multicore optical fiber according to claim 2, wherein the wavelength λ is 1530 nm.

5. A multicore optical fiber comprising:

a glass optical fiber having a plurality of cores each extending along a central axis, and a cladding surrounding the plurality of cores, the plurality of cores including a first core with a high refractive index and a second core with a refractive index lower than that of the first core; and a resin coating provided on an outer peripheral surface of the glass optical fiber, wherein on a cross-section of the multicore optical fiber orthogonal to the central axis, an arrangement of centers of a plurality of portions that has a refractive index different from a refractive index of the cladding has no rotational symmetry about a center of the cross-section, the multicore optical fiber further comprises a mode leakage adjustment structure for reducing a difference between a cutoff wavelength of a residual higher-order mode in the second core and a cutoff wavelength of a residual higher-order mode in the first core, wherein the mode leakage adjustment structure includes:

a double cladding structure of the cladding comprising an inner cladding surrounding the plurality of cores and having an outer diameter D, and an outer cladding on an outer peripheral surface of the inner cladding and having a refractive index higher than that of the inner cladding; and a core arrangement in which centers of the first core and the second core are shifted by Δx along a line perpendicular to the central axis so that the first core is closer to an inner surface of the outer cladding than the second core, with respect to a reference positions of the first core and the second core whose centers are equidistant from the inner surface of the outer cladding in the cross-section.

6. The multicore optical fiber according to claim 5, wherein a ratio Δx/D of a shift amount Δx of the first core and the second core to the outer diameter D of the inner cladding is greater than 0.01.

7. The multicore optical fiber according to claim 5, wherein the multicore optical fiber comprises a marker extending along the plurality of cores and having a refractive index higher than that of the outer cladding, and a center of the marker is arranged such that a distance to a center of the first core is shorter than a distance to a center of the second core.

8. The multicore optical fiber according to claim 2, wherein the cladding includes an inner cladding surrounding the plurality of cores and the high refractive index marker, and an outer cladding provided on an outer peripheral surface of the inner cladding and having a refractive index higher than that of the inner cladding.

9. The multicore optical fiber according to claim 6, wherein the multicore optical fiber comprises a marker extending along the plurality of cores and having a refractive index higher than that of the outer cladding, and a center of the marker is arranged such that a distance to a center of the first core is shorter than a distance to a center of the second core.

* * * * *